United States Patent
Zhou et al.

(10) Patent No.: US 11,425,311 B1
(45) Date of Patent: Aug. 23, 2022

(54) AUTOEXPOSURE METHOD

(71) Applicant: MLOptic Corp, Redmond, WA (US)

(72) Inventors: Wei Zhou, Sammamish, WA (US);
Nathan Yang, Bellevue, WA (US); Wei Wang, Nanjing (CN); Tang Song, Medina, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/682,143

(22) Filed: Feb. 28, 2022

(51) Int. Cl.
*H04N 5/235* (2006.01)
*H04N 5/372* (2011.01)

(52) U.S. Cl.
CPC ......... *H04N 5/2353* (2013.01); *H04N 5/2351* (2013.01); *H04N 5/372* (2013.01)

(58) Field of Classification Search
CPC .... H04N 5/2353; H04N 5/2351; H04N 5/372; H04N 5/2352; H04N 5/353
See application file for complete search history.

(56) References Cited

U.S. PATENT DOCUMENTS

| | | | | |
|---|---|---|---|---|
| 5,703,644 A * | 12/1997 | Mori | .................... | H04N 5/2351 348/221.1 |
| 11,317,078 B2 * | 4/2022 | Zhang | ................. | H04N 13/296 |
| 2007/0115372 A1 * | 5/2007 | Wu | ...................... | H04N 5/2351 348/230.1 |
| 2014/0362203 A1 * | 12/2014 | Delaney | ............ | G01N 21/8806 348/79 |
| 2022/0012915 A1 * | 1/2022 | He | ......................... | G06T 5/002 |

OTHER PUBLICATIONS

Yuanhang Su, Joe Yuchieh Lin, C.-C. Jay Kuo, A model-based approach to camera's auto exposure control, J. Vis. Commun. Image R. 36 (2016) 122-129, M.T. Sun, 5-A-201 Changxing Hao Rizi, Xinbei District, Changzhou, Jiangsu, China.

* cited by examiner

*Primary Examiner* — Luong T Nguyen
(74) *Attorney, Agent, or Firm* — Tracy Jong Law Firm; Tracy P. Jong; Cheng Ning Jong

(57) ABSTRACT

A method for controlling an autoexposure function of a camera to a gray level setting, the method including exposing an imaging device of the camera for a first exposure duration and obtaining a first gray level of the imaging device of the camera, exposing the imaging device of the camera for a second exposure duration within the first exposure duration and the maximum exposure duration and obtaining a second gray level of the imaging device of the camera, determining whether the first gray level and the second gray level are upward-trending from the first exposure duration to the second exposure duration and if the first gray level and the second gray level are determined to be upward-trending, interpolating for a target exposure duration based on the gray level setting, the first exposure duration and the first gray level.

3 Claims, 5 Drawing Sheets

AUTOEXPOSURE METHOD

BACKGROUND OF THE INVENTION

1. The Field of the Invention

The present invention relates to an automatic algorithm to correct a camera early saturation floor problem in connection to its autoexposure algorithm. More specifically, the present invention is directed to an automatic algorithm to correct a CCD camera early saturation floor problem in connection to its autoexposure algorithm.

2. Background Art

Autoexposure (AE) control of digital cameras, e.g., complementary metal-oxide-semiconductor (CMOS) and charge-coupled device (CCD) remains a subject of scrutiny due to several challenges that still plague these technologies. Applicant discovered that, on certain cameras, the AE control is plagued with the non-convergence of target gray levels due to the traditional assumption of a linear or piece-wise linear relationship between the exposure time and the image brightness level, resulting in the underexposure of the images on the displays of these cameras. A generic AE control algorithm which treats the relationship between the exposure time and the image brightness level as linear or piece-wise linear, fails to take into account that the image brightness level of a certain camera can never recover from its early dip in the image brightness level. Therefore, an autoexposure algorithm based solely on the image brightness level would never reach its target gray level according to the gray level setting of the AE function of the camera. In addition, an AE control strategy that caters to bright light may inadvertently cause its malfunction under dim light conditions.

There exists a need to ensure that an AE control can be successfully performed on CCD cameras experiencing this early saturation floor problem in their exposure to bright light and dim light. There exists a need to ensure that an AE control incorporating a correction routine can be performed in real time and as an integral part of the AE routine.

SUMMARY OF THE INVENTION

In accordance with the present invention, there is provided a method for controlling an autoexposure (AE) function of a camera to a gray level setting, the method including:

(a) exposing an imaging device of the camera for a first exposure duration within a maximum exposure duration and a minimum exposure duration and obtaining a first gray level of the imaging device of the camera as a result of the exposure of the imaging device of the camera for the first exposure duration, wherein if the first gray level falls within a high gray level and a low gray level, exposing the imaging device of the camera for a second exposure duration within the first exposure duration and the maximum exposure duration and obtaining a second gray level of the imaging device of the camera as a result of the exposure of the imaging device of the camera for the second exposure duration;

(b) determining whether the first gray level and the second gray level are upward-trending or downward-trending from the first exposure duration to the second exposure duration; and (c) if the first gray level and the second gray level are determined to be upward-trending from the first gray level to the second gray level, interpolating for a target exposure duration based on the gray level setting, the first exposure duration and the first gray level, if the first gray level and the second gray level are determined to be downward-trending from the first gray level to the second gray level, exposing the imaging device of the camera for a third exposure duration within the maximum exposure duration and the minimum exposure duration and obtaining a third gray level of the imaging device of the camera as a result of the exposure of the imaging device of the camera for the third exposure duration, wherein the third exposure duration is less than the second exposure duration, if at least one of the second gray level and said third gray level is determined to fall on an upward-trending region of a gray level vs. exposure curve of the imaging device of the camera, interpolating for the target exposure duration based on the gray level setting, the third exposure duration and the third gray level, otherwise, iterating the third exposing step until an earlier gray level and a later gray level are determined to be upward-trending from the later gray level to the earlier gray level and interpolating for the target exposure duration based on the gray level setting, the later exposure duration and the gray level corresponding to the later exposure duration.

In one embodiment, the selection of a later exposure duration is based upon binary folding. In one embodiment, the camera is an imaging device adapted to function according to the principles of an image sensing device of a charge-coupled device (CCD) camera.

An object of the present invention is to provide an automatic correction routine to an autoexposure method which provides a solution to a non-converging autoexposure routine where the non-converging autoexposure routine is based solely on image brightness received at an image sensing device.

Another object of the present invention is to provide an automatic correction routine to an autoexposure method which corrects for the non-convergence of a prior art autoexposure routine due to a camera early saturation floor problem such that an appropriate brightness or gray level is represented at the output or display of the image sensing device.

Another object of the present invention is to provide an automatic correction routine to an autoexposure method which corrects for a camera early saturation floor with a solution which converges expeditiously.

Another object of the present invention is to provide an automatic correction routine to an autoexposure method that is an integral part of the AE routine.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

1—camera
2—control device
4—image sensing device, e.g., charge-coupled device (CCD) pixels
6—display
8—step of exposing image sensing device to light
9—step of exposing image sensing device to light
10—step of determining whether sensed gray level is upward-trending
11—step of exposing image sensing device to light
12—step of interpolating for target exposure time
13—step of interpolating for target exposure time
14—divide between the upward-trending region and the downward-trending region of a gray level vs. exposure duration curve
15—step of determining whether sensed gray level is upward-trending
16—user or observer
18—saturation point
20—curve corresponding to exposure to bright light
22—curve corresponding to exposure to dim light
24—upward-trending region of a gray level vs. exposure duration curve
26—downward-trending region of a gray level vs. exposure duration curve Particular Advantages of the Invention In one embodiment, the present method or algorithm provides a solution to a non-converging autoexposure routine where the non-converging autoexposure routine is based solely on image brightness received at an image sensing device. In one embodiment, the present method or algorithm provides an automatic correction routine of an autoexposure method which corrects for the non-convergence of a prior art autoexposure routine due to a camera early saturation floor problem such that an appropriate brightness or gray level is represented at the output or display of the image sensing device. In one embodiment, the present automatic correction routine of the autoexposure method provides an integral solution which converges expeditiously. In all embodiments of the present invention, the solutions for the non-converging autoexposure routine and the optimization useful for reducing delays in convergence can be implemented without significant impacts to the cost of computation.

The present method provides a solution to a non-converging autoexposure routine without requiring the critical exposure time of an image sensing device of the camera to be established either manually or automatically first. The present method is suitable for use with any camera exhibiting the anomaly disclosed elsewhere herein. The gray level vs. exposure duration curve of a camera need not be pre-learned before the AE process can be made to pursue the desired gray level setting.

Detailed Description of a Preferred Embodiment

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
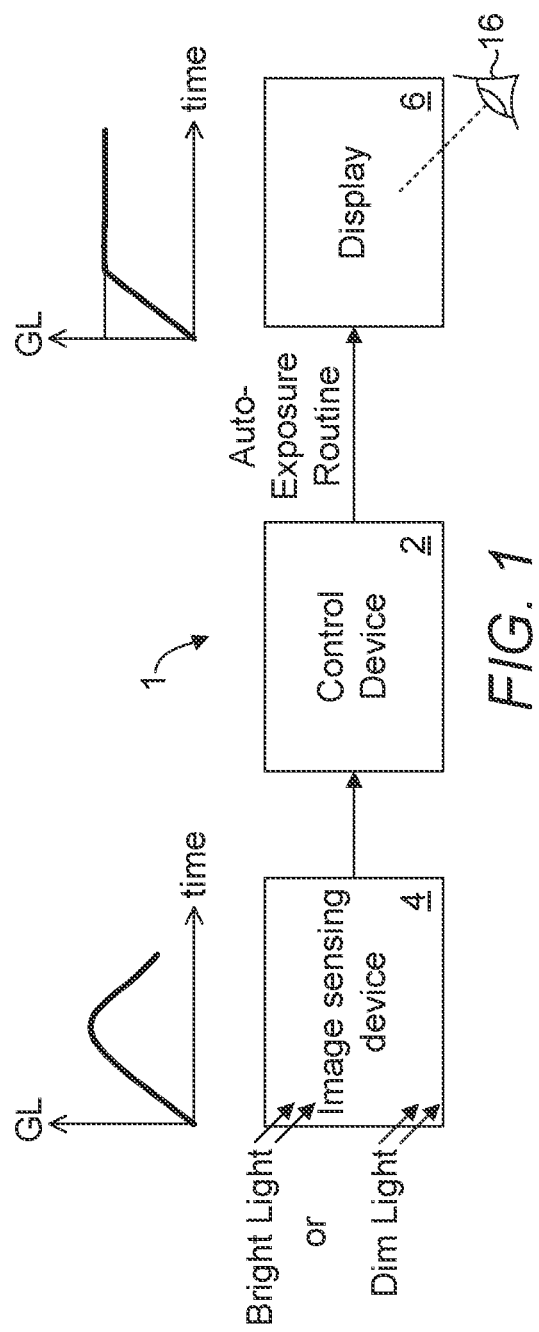
FIG. 1 is a diagram depicting a system which shows an input to an image sensing device and an output device having its image brightness controlled by an autoexposure routine of a control device.

FIG. 1 is a diagram depicting a system which shows an input to an image sensing device 4 and an output device having its image brightness controlled by an autoexposure (AE) routine of a control device 2. The image sensing device 4 is a charge-coupled device (CCD) of a camera or any CCD adapted to function according to the principles of an image sensing device of a CCD camera. Both the image sensing device 4 and display 6 are functionally connected to the control device 6. In one example, an image sensing device 4 includes a semiconductor divided up into pixels. As light hits a pixel, the pixel can be filled with one or more electrons. The gray level output of the pixel corresponds to the number of electrons in the pixel. This output is received at the control device 2 before it is operated on such that a modified output based on the output received from the image sensing device 4 can be provided to the display 6 where the image brightness of an image is discernible by a user 16. In this example, the modified output is shown to a user 16. However, this modified output may also be used by an image processing algorithm where the appropriate brightness or gray level of the modified output can affect the manner in which features are extracted from the modified output. Therefore it is important for the modified output to be disposed at an appropriate brightness. The control device 2 represents any device configured to receive the output from image sensing device 4, generates a modified output using, e.g., a resident AE routine or a remotely-located AE routine and communicates this modified output to the display.

Figure 2:
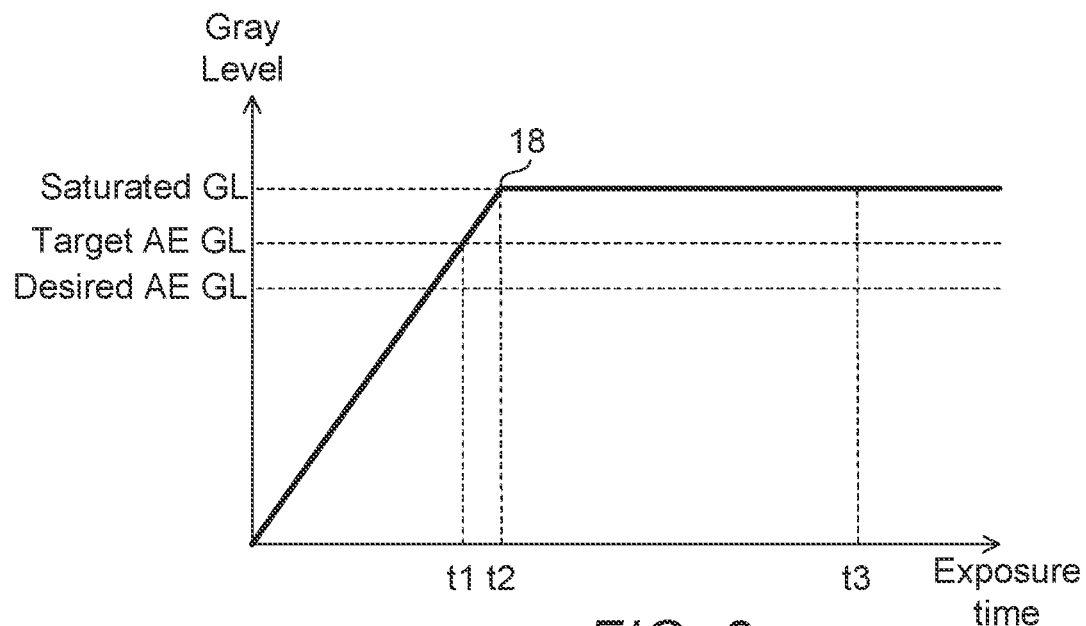
FIG. 2 is a chart relating the image brightness and exposure time of an image sensing device, showing a theoretical or assumed gray level response of a conventional CCD image sensing device.
Figure 3:
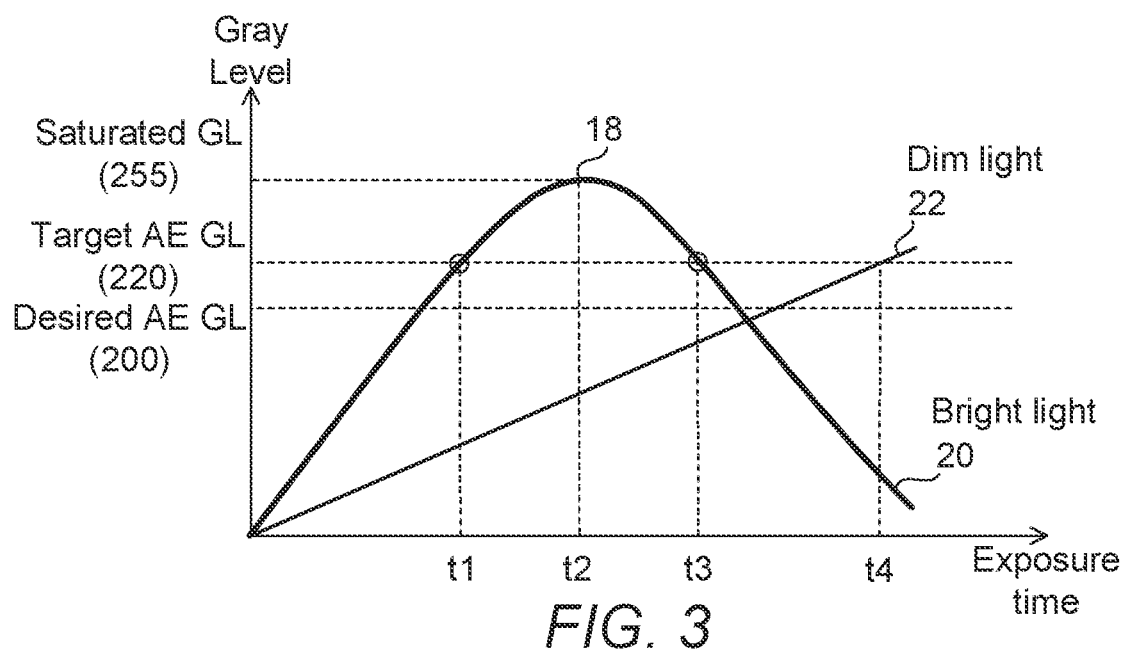
FIG. 3 is a chart relating the image brightness and exposure time of an image sensing device, showing an early saturation floor problem of a CCD image sensing device.

FIG. 2 is a chart relating the image brightness and exposure time of an image sensing device showing a theoretical or assumed gray level response of a conventional CCD image sensing device. It shall be noted that the gray level response rises substantially proportionally with time until time t2, at which point additional exposure to light does not alter the gray level as it reaches the saturation point 18. FIG. 2 depicts an image brightness-exposure time curve applicable to some CCD image sensing devices and modified outputs or autoexposure-applied outputs received at a display. However, Applicant discovered that in some CCD systems, anomalies do occur where the image brightness does not correspond proportionally with exposure time. One such example is illustrated in FIG. 3. FIG. 3 is a chart relating the image brightness, e.g., expressed in an 8-bit system ranging from 0-255, and exposure time or duration of an image sensing device, showing an early saturation floor problem or anomaly of a CCD image sensing device. It shall be noted that curve 20 shows an increasing trend before reaching a peak and subsequently decreasing to a low gray level even with a longer exposure time. A common practice to attempt to resolve such an issue is by modifying the output from an image sensing device with a gain sufficiently significant to raise the decreasing portion of curve 20. It shall be noted however that, by applying a large gain, when the image sensing device is exposed to dim light, the displayed image will appear overexposed and the noise floor is significantly increased. Therefore, in the present solution to the early saturation floor problem, potential problems that can occur for exposure to a dim light condition must be considered.

Figure 4:
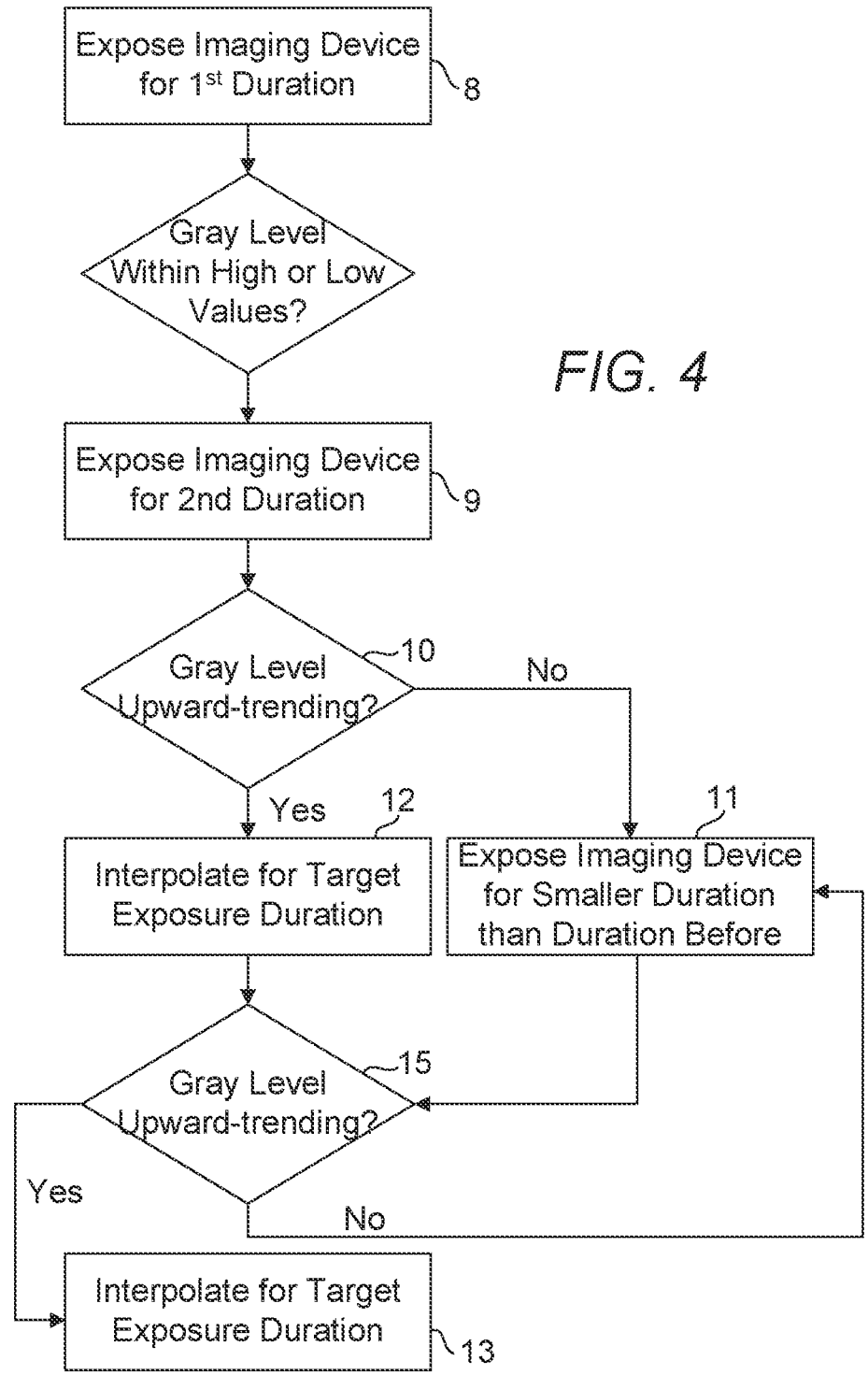
FIG. 4 is a flow diagram depicting an automatic correction routine integrally incorporated in an autoexposure routine suitable for correcting an early saturation floor problem of a CCD image sensing device.
Figure 5:
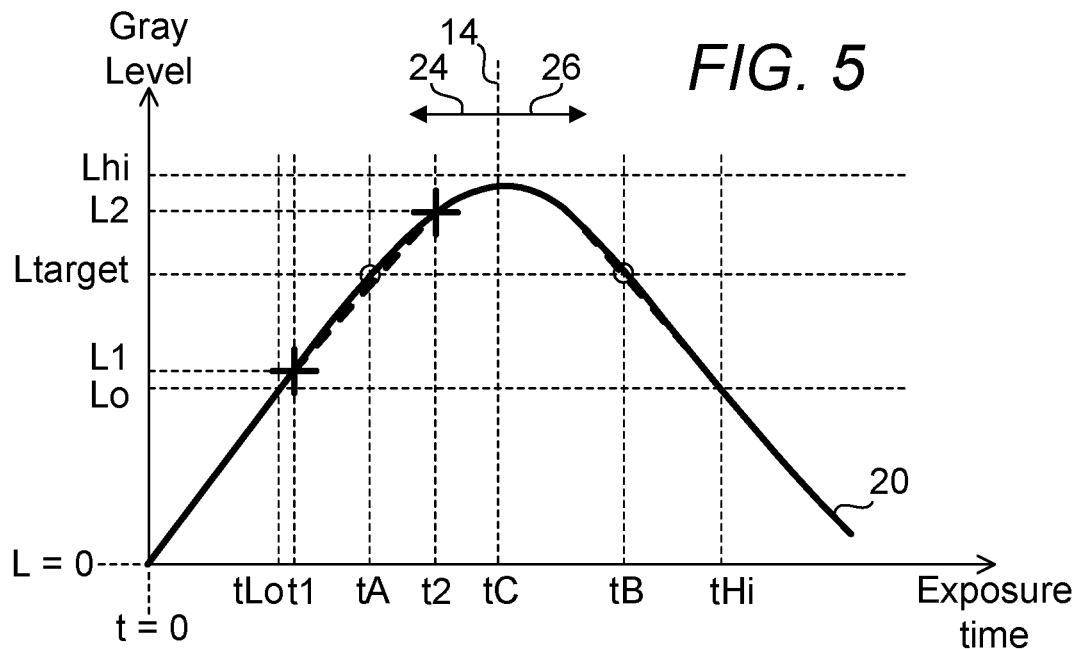
FIG. 5 is a chart relating the image brightness and exposure time of an image sensing device, showing an early saturation floor problem of a CCD image sensing device and a manner in which the automatic correction routine of FIG. 4 arrives at the exposure duration which generates the target gray level.
Figure 6:
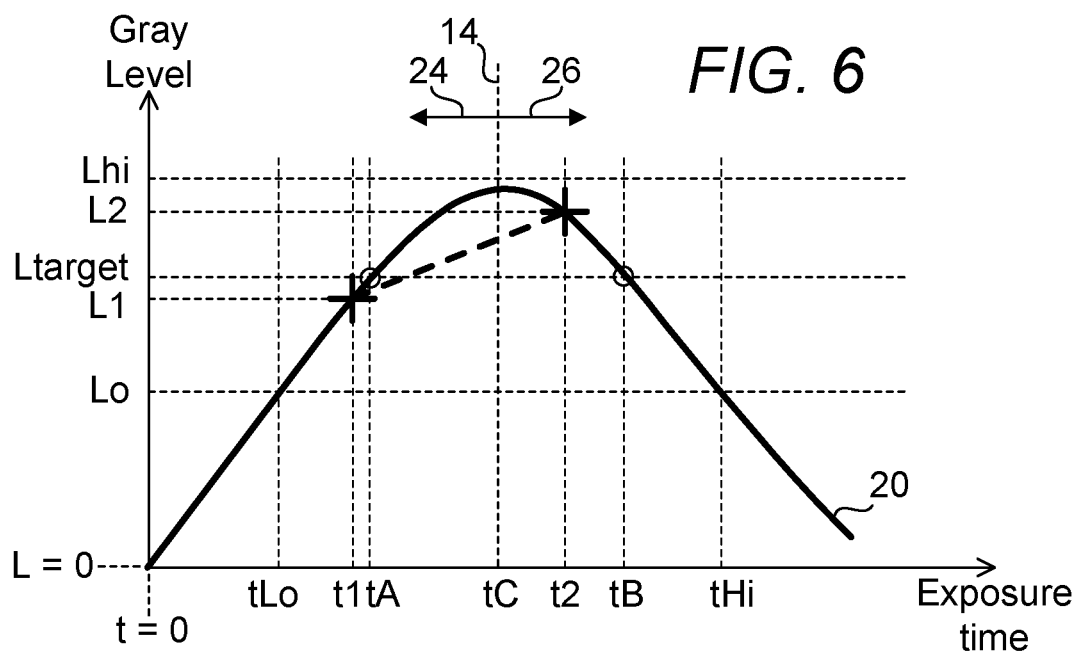
FIG. 6 is a chart relating the image brightness and exposure time of an image sensing device, showing an early saturation floor problem of a CCD image sensing device and a manner in which the automatic correction routine of FIG. 4 handles an attempt to resolve the exposure duration which generates the target gray level.

FIG. 4 is a flow diagram depicting an automatic correction routine integrally incorporated in an AE routine suitable for correcting an early saturation floor problem of a CCD image sensing device. FIG. 5 is a chart relating the image brightness and exposure time of an image sensing device, showing an early saturation floor problem of a CCD image sensing device and a manner in which the automatic correction routine of FIG. 4 arrives at the exposure duration which generates the target gray level. The present method is essentially a correction routine which automatically ensures that the camera control device 2 does not simply pursue a desired gray level setting at a larger exposure time. Upon automatically detecting an anomaly in the gray level response vs. exposure duration, such as the behavior illustrated in FIG. 3, the camera control device seeks to obtain an optimal or shortest exposure duration that could result in the desired or target gray level. It shall be noted that the gray level vs. exposure duration curves of FIGS. 5-8 are unknown to the camera control device at the time the camera control device attempts to set the gray level according to the gray level setting of an AE process. The present method for controlling an AE process of a camera to a gray level setting includes first exposing 8 an imaging device of the camera for a first exposure duration (at t1) within a maximum exposure duration and a minimum exposure duration and obtaining a first gray level of the imaging device of the camera as a result of the exposure of the imaging device of the camera for the first exposure duration. If the first gray level falls within a high gray level and a low gray level, the imaging device of the camera is exposed for a second exposure duration (at t2) within the first exposure duration and the maximum exposure duration and a second gray level is obtained of the imaging device of the camera as a result of the exposure of the imaging device of the camera for the second exposure duration. The minimum exposure duration is a duration impossible for any camera to have attained a sufficient exposure to achieve a suitable gray level. The maximum exposure duration is a duration in which any camera would have sufficiently been exposed to achieve the desired gray level. These two values are pre-established to serve as the minimum and maximum limits for various exposure durations to be attempted. In other words, exposure durations outside these limits will not be attempted such that convergence of the target exposure duration can be hastened. The high gray level and the low gray level serve similar purposes as the maximum and minimum exposure durations. The high gray level can be an offset above the gray level setting while the low gray level can be an offset below the gray level setting. The control device 2 then determines in step 10 whether the first exposure duration and the second exposure duration are upward-trending or downward-trending from the first exposure duration to the second exposure duration. If the first gray level and the second gray level are determined to be upward-trending from the first gray level to the second gray level, a target exposure duration is interpolated in step 12 based on the gray level setting of the AE, the first exposure duration and the first gray level. FIG. 6 is a chart relating the image brightness and exposure time of an image sensing device, showing an early saturation floor problem of a CCD image sensing device and a manner in which the automatic correction routine of FIG. 4 handles an attempt to resolve the exposure duration which generates the target gray level. It shall be noted that the gray level responses shown in both FIGS. 5 and 6 fit the upward-trending gray levels even though at the second exposure duration, the gray level in FIG. 6 has ventured into the downward-trending region of the curve. For the scenario in FIG. 6, note that for interpolation purposes, the earlier exposure duration shall be used as the earlier exposure duration falls in the substantially linear region of the gray level vs. exposure duration curve that is upward-trending. An interpolation example is provided as follows:

Assume at exposure duration t1, the gray level is L1. The exposure duration to for the target gray level Ltarget can then be resolved as follows:

$$L1/t1 = Ltarget/tA$$

$$tA = (Ltarget/L)*t1$$

Figure 7:
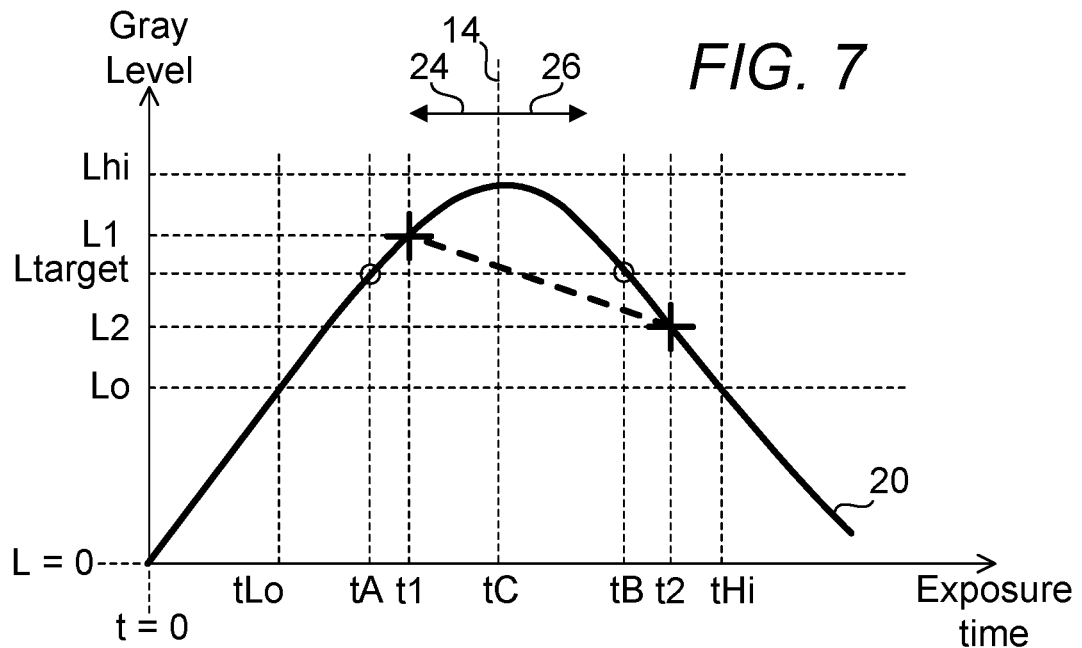
FIG. 7 is a chart relating the image brightness and exposure time of an image sensing device, showing an early saturation floor problem of a CCD image sensing device and a manner in which the automatic correction routine of FIG. 4 handles an attempt to resolve the exposure duration which generates the target gray level.
Figure 8:
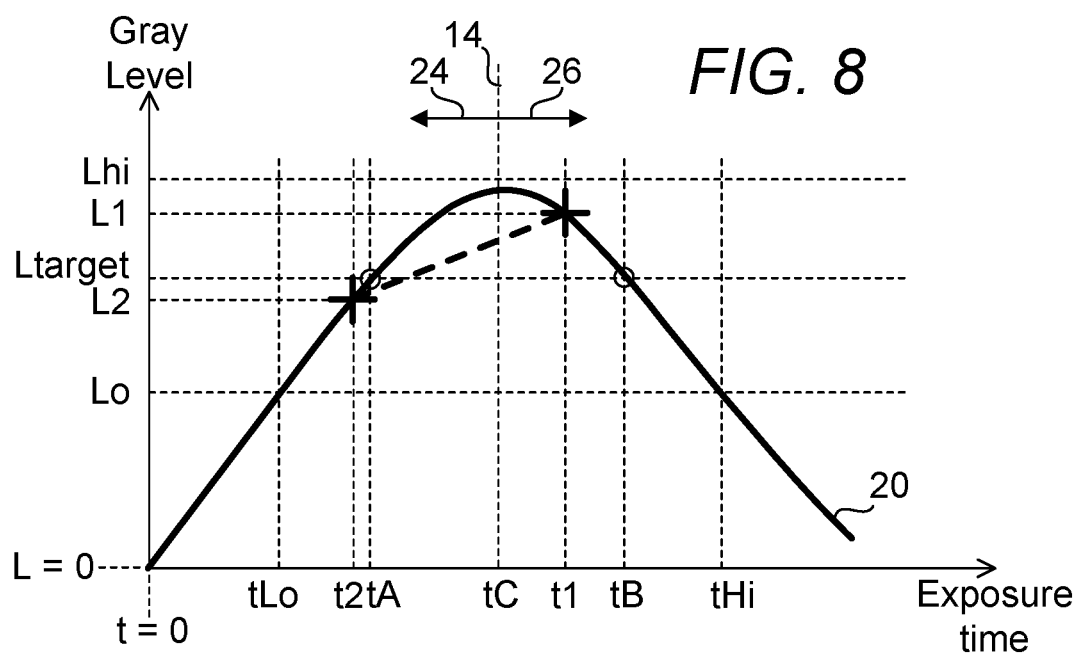
FIG. 8 is a chart relating the image brightness and exposure time of an image sensing device, showing an early saturation floor problem of a CCD image sensing device and a manner in which the automatic correction routine of FIG. 4 handles an attempt to resolve the exposure duration which generates the target gray level.

As used herein, the label t1 represents an earlier-attempted exposure duration and the label t2 represents a later-attempted exposure duration. If the first gray level and the second gray level are determined to be downward-trending, e.g., as shown in FIG. 7, from the first gray level to the second gray level, the imaging device of the camera will be exposed 8 for a third exposure duration within the maximum exposure duration and the minimum exposure duration and obtaining a third gray level of the imaging device of the camera as a result of the exposure of the imaging device of the camera for the third exposure duration. FIG. 7 is a chart relating the image brightness and exposure time of an image sensing device, showing an early saturation floor problem of a CCD image sensing device and a manner in which the automatic correction routine of FIG. 4 handles an attempt to resolve the exposure duration which generates the target gray level. Subsequently, the third exposure duration (t2) that is less than the second exposure duration (t1) as gray levels of smaller exposure durations will be explored as shown in FIG. 8. The second exposure duration has been determined to have ventured into the downward-trending region 26 of the gray level vs. exposure duration curve or a region to the right of the divide 14. FIG. 8 is a chart relating the image brightness and exposure time of an image sensing device, showing an early saturation floor problem of a CCD image sensing device and a manner in which the automatic correction routine of FIG. 4 handles an attempt to resolve the exposure duration which generates the target gray level. If at least one of the second gray level and the third gray level is determined to fall in an upward-trending region of the gray level vs. exposure duration curve as shown in FIG. 8, the target exposure duration will be interpolated 12 based on the gray level setting, the third exposure duration and the third gray level. In one embodiment, the third exposing step will be iterated until an earlier gray level (due to an exposure duration attempted earlier) and a later gray level (due to an exposure duration attempted later) are determined to be upward-trending from the later gray level to the earlier gray level and the target exposure duration will be interpolated 12 based on the gray level setting, the later exposure duration and the gray level corresponding to the later exposure duration. In one embodiment, the selection of a later exposure duration is based upon binary folding to hasten convergence of the AE process. In one embodiment, the camera is an imaging device adapted to function according to the principles of an image sensing device of a charge-coupled device (CCD) camera.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for controlling an autoexposure (AE) function of a camera to a gray level setting, said method comprising:
   (a) exposing an imaging device of the camera in a first exposing step for a first exposure duration within a maximum exposure duration and a minimum exposure duration and obtaining a first gray level of the imaging device of the camera as a result of exposure of the imaging device of the camera for said first exposure duration, wherein if said first gray level falls within a high gray level and a low gray level, exposing the imaging device of the camera in a second exposing step for a second exposure duration within said first exposure duration and said maximum exposure duration and obtaining a second gray level of the imaging device of the camera as a result of exposure of the imaging device of the camera for said second exposure duration;
   (b) determining whether said first gray level and said second gray level are upward-trending or downward-trending from said first exposure duration to said second exposure duration; and
   (c) if said first gray level and said second gray level are determined to be upward-trending from said first gray level to said second gray level, interpolating for a target exposure duration based on the gray level setting, said first exposure duration and said first gray level, if said first gray level and said second gray level are determined to be downward-trending from said first gray level to said second gray level, exposing the imaging device of the camera in a third exposing step for a third exposure duration within said maximum exposure duration and said minimum exposure duration and obtaining a third gray level of the imaging device of the camera as a result of exposure of the imaging device of the camera for said third exposure duration, wherein said third exposure duration is less than said second exposure duration, if at least one of said second gray level and said third gray level is determined to fall in an upward-trending region of a gray level versus exposure curve of the imaging device of the camera, interpolating for said target exposure duration based on the gray level setting, said third exposure duration and said third gray level, otherwise, iterating said third exposing step until an earlier gray level and a later gray level are determined to be upward-trending from said later gray level to said earlier gray level and interpolating for the target exposure duration based on the gray level setting and a later exposure duration corresponding to said later gray level.

2. The method of claim 1, a selection of said later exposure duration is based upon binary folding to hasten a convergence of the AE function.

3. The method of claim 1, wherein the camera is adapted to function according to principles of an image sensing device of a charge-coupled device (CCD) camera.

* * * * *